United States Patent [19]

Nomura et al.

[11] Patent Number: 4,822,846

[45] Date of Patent: Apr. 18, 1989

[54] MOLDING POLYAMIDE RESIN COMPOSITION

[75] Inventors: Isao Nomura; Kenichi Narita, both of Hiratsuka; Masashi Kurokawa, Hadano, all of Japan

[73] Assignee: Mitsubishi Gas Chemical Company, Inc., Tokyo, Japan

[21] Appl. No.: 127,505

[22] Filed: Dec. 1, 1987

[30] Foreign Application Priority Data

Dec. 1, 1986 [JP] Japan ................................ 61-284430
Dec. 1, 1986 [JP] Japan ................................ 61-284431

[51] Int. Cl.$^4$ ............................................. C08L 77/00
[52] U.S. Cl. ....................................... 524/538; 525/432
[58] Field of Search ........................... 525/432; 524/538

[56] References Cited

U.S. PATENT DOCUMENTS

| | | | |
|---|---|---|---|
| 3,393,252 | 7/1968 | Zimmerman | 525/432 |
| 3,968,071 | 7/1976 | Miyamoto et al. | 525/432 |
| 4,133,802 | 1/1979 | Hachibashi et al. | 525/432 |
| 4,702,859 | 10/1987 | Shimizu et al. | 525/432 |

OTHER PUBLICATIONS

Chemical Abstracts, vol. 83, No. 12, Dec. 22, 1975 Showa Denko K.K.

*Primary Examiner*—Lewis T. Jacobs
*Assistant Examiner*—A. Carrillo
*Attorney, Agent, or Firm*—Wenderoth, Lind & Ponack

[57] ABSTRACT

A molding polyamide resin composition comprising 100 parts by weight of (A) a poly(m-xylylenesebacamide) resin, and 1 to 20 parts by weight of (B) a crystalline polyamide having a melting point about 20°–30° C. higher than that of the poly(m-xylyenesebacamide) resin (A).

3 Claims, No Drawings

MOLDING POLYAMIDE RESIN COMPOSITION

This invention relates to a poly(m-xylylenesebacamide) resin composition. More specifically, it relates to a poly(m-xylylenesebacamide) resin composition comprising a poly(m-xylylenesebacamide) resin and another crystalline polyamide resin and for suitable uses, further comprising glass fibers. This composition has excellent moldability, mechanical properties, and chemical resistance, especially excellent resistance to calcium chloride stress cracking.

Calcium chloride contained in inorganic salts scattered as a thawing agent on road surfaces during the wintertime adheres to, or makes contact with, automobile parts, for example parts with an engine room such as a cylinder head cover or a radiator cooling fan, during running. When the automobile parts are made of plastics, therefore, they require resistance to calcium chloride (resistance to calcium chloride stress cracking).

Polyamide 12 (nylon 12) is known as a resin having excellent resistance to calcium chloride stress cracking. Polyamide 12 has been used as a material for automobile parts, but it has low mechanical properties such as tensile strength and stiffness, and does not have fully satisfactory properties for practical applications.

It is an object of this invention to provide a novel polyamide resin composition having excellent properties.

Another object of this invention is to provide a polyamide resin composition having excellent mechanical properties and resistance to calcium chloride stress cracking.

Still another object of this invention is to provide a polyamide resin composition which permits shortening of the molding cycle time by shortening the cooling time during injection molding.

Further objects of this invention along with its advantages will become apparent from the following description.

According to this invention, these objects and advantages are achieved by a molding polyamide resin composition comprising 100 parts by weight of (A) a poly(m-xylylenesebacamide) resin, and 1 to 20 parts by weight of (B) a crystalline polyamide having a melting point about 20°–30° C. higher than that of the poly(m-xylylenesebacamide) resin (A).

The poly(m-xylylenesebacamide) resin (A) constituting the molding polyamide resin composition of this invention is a polyamide resin [to be sometimes referred to as polyamide MXD10 (nylon MXD10) hereinafter] produced from m-xylylenediamine as a diamine component and sebacic acid as a dibasic acid.

The resin (A) may be a copolymer in which a portion, for example up to 40% by weight, of m-xylylenediamine and/or sebacic acid is replaced by another dicarboxylic acid and/another diamine.

A homopolymer of polyamide MXD10 is preferred as the resin (A).

Preferably, the resin (A) has a relative viscosity, measured at 25° C. in 96% sulfuric acid, of 2.0 to 2.5.

The crystalline polyamide resin, the other component constituting the resin composition, has a melting point about 20° to 30° C. higher than the melting point (about 193° C.) of the poly(m-xylylenesebacamide) resin (A).

Polyamide 612 (nylon 612) (melting point: 215° C.) and polyamide 610 (nylon 610) (melting point: 220° C.), for example, can be suitably used as the crystalline polyamide resin (B).

The polyamide resin composition of this invention comprises 100 parts of the polyamide MXD10 (A) and 1 to 20 parts by weight, preferably 1 to 10 parts by weight, of the crystalline polyamide resin (B). These proportions of the components make it possible to provide a composition which meets the objects of the invention, and for example, has excellent mechanical properties, or permits shortening of the molding cycle time during injection molding.

The resin composition of this invention may contain at least one third component selected from, for example, antioxidants, ultraviolet absorbers, nucleating agents, plasticizers, fire retardants, antistatic agents and lubricants in proportions which do not adversely affect the properties of the resulting resin composition. The use of such additives may further lead to the improvement of the mechanical properties or thermal properties of the composition.

According to this invention, a polyamide resin composition having particularly improved mechanical properties such as tensile strength, tensile modulus, flexural strength and flexural modulus is provided by incorporating glass fibers further in the aforesaid polyamide resin composition.

The amount of the glass fibers to be included in the composition of this invention is 10 to 150 parts by weight, preferably 30 to 120 parts by weight, per 100 parts by weight of the polyamide MXD10 resin (A).

The following examples illustrate the present invention in greater detail.

The various properties were measured by the following methods.

(1) Tensile strength and modulus: ASTM D628
(2) Flexural strength and modulus: ASTM D790
(3) Izod impact strength: ASTM D256
(4) Tensile impact strength: ASTM D1822
(5) Molding shrinkage: ASTM D955
(6) Water absorption: ASTM D570
(7) Coefficient of linear expansion: ASTM D966
(8) Resistance to calcium chloride stress cracking The resistance to calcium chloride stress cracking was measured by the following procedure.

1. Test specimen: Dumbbell sample for tensile test in accordance with ASTM D628

2. Testing procedure (1) The test specimen is immersed in boiling water for 1 hour.

(2) It is left to stand at room temperature for 30 minutes.

(3) A saturated aqueous solution of calcium chloride is coated on one surface of the specimen.

(4) The specimen is heated at 100° C. for 30 minutes in a heating oven.

(5) It is left to stand at room temperature for 30 minutes.

One cycle consisting of the operations (1) to (5) is repeated 10 times.

3. Method of evaluating resistance to calcium stress cracking (1) The surface of the specimen is observed after each cycle is terminated. The occurrence of cracking on the surface of the specimen was examined, and the cycle during which cracking first occurred was determined.

(2) The specimen subjected to 10 cycles of the above operations was tested for tensile strength in accordance with ASTM D628, and the percent retention of the tensile strength was calculated.

EXAMPLES 1–3 AND COMPARATIVE EXAMPLE 1

In each run, polyamide MXD10 synthesized from m-xylylenediamine and sebacic acid [having a relative viscosity, measured at 25° C. for a solution of 1 g of the polymer in 100 ml of 96% sulfuric acid (to be simply referred to as "relative viscosity") of 2.05] and polyamide 612 (relative viscosity: 2.15) were mixed in the proportions shown in Table 1 by a V-type blender, and then extruded into a string form by using a screw melt-extruder. The strand was passed through a water bath to cool it, cut to pellets by a rotary cutter, and then dried to prepare strand cut pellets.

The molded specimens were prepared by using an injection molding machine at a mold temperature of 100° C. At this time, the cooling time was changed, and the required cooling time was evaluated by measuring the surface hardsss of the product immediately after mold opening.

The surface hardness ("D-type hardness") was measured by using a duratometer D-type hardness tester (ASTM D2240).

After molding, the surface hardness of the molded product (¼ inch thick) immediately after the mold opening was measured for each of the cooling times. The results are shown in Table 1.

In Comparative Example 1, polyamide MXD10 was used alone. The results are also shown in Table 1.

When the D-type hardness was less than 30, the material flowing into the mold did not sufficiently solidify but was soft. Hence, the sprue was difficult to pull up, or the sprue or runner portion broke at the time of mold opening.

TABLE 1

| | Proportions (parts by weight) | | D-type hardness at a mold temperature of 100° C. Time required for cooling (seconds) | |
|---|---|---|---|---|
| Run | Polyamide MXD10 | Polyamide 612 | 25 | 30 |
| Ex. 1 | 95 | 5 | 18 | 25 |
| Ex. 2 | 92 | 8 | 33 | 42 |
| Ex. 3 | 85 | 15 | 38 | 43 |
| CEx. 1 | 100 | 0 | 3 | 5 |

Ex. = Example; CEx. = Comparative Example

EXAMPLE 4–6

In each run, the same polyamide MXD10 as used in Examples 1 to 3 and polyamide 610 (relative viscosity: 2.59) were mixed in the proportions indicated in Table 2, extruded as in Examples 1 to 3 to prepare strand cut pellets.

Test specimens were prepared by using an injection molding machine, and the required cooling time was evaluated, as in Examples 1 to 3. The results are shown in Table 2.

TABLE 2

| | Proportions (parts by weight) | | D-type hardness at a mold temperature of 100° C. Time required for cooling (seconds) | |
|---|---|---|---|---|
| Run | Polyamide MXD10 | Polyamide 612 | 25 | 30 |
| Ex. 4 | 95 | 5 | 29 | 39 |
| Ex. 5 | 92 | 8 | 34 | 44 |
| Ex. 6 | 85 | 15 | 38 | 45 |
| CEx. 1 | 100 | 0 | 3 | 5 |

The results obtained in Comparative Example 1 are also given in Table 2 for easy reference.

EXAMPLES 7–9 AND COMPARATIVE EXAMPLES 2–3

In each run, the same polyamide MXD10 and polyamide 612 as used in Examples 1 to 3 were processed into strand cut pellets.

The time required for cooling (the time required until the D-type hardness reached 30, 40, and 50 respectively) when the molded specimens were obtained by using an injection molding machine as in Examples 1 to 3, and the properties of the molded specimens are summarized in Table 3.

In Comparative Example 2, the polyamide MXD10 and polyamide 612 were used in the proportions outside the scope of the invention. In Comparative Example 3, only polyamide MXD10 was used. The results are also shown in Table 3.

In Examples 7 to 9 in which part of polyamide MXD10 was replaced with polyamide 612, the times required for cooling during injection molding were drastically shortened, and an improvement in various properties was noted.

TABLE 3

| | Example | | | Comparative Example | |
|---|---|---|---|---|---|
| Run | 7 | 8 | 9 | 2 | 3 |
| Polyamide MXD10 (parts by weight) | 95 | 90 | 80 | 75 | 100 |
| Polyamide 612 (parts by weight) | 5 | 10 | 20 | 25 | 0 |
| TEST RESULTS | | | | | |
| Time required for cooling (seconds) D-type hardness | | | | | |
| up to 30 | 21 | 19 | 16 | 15 | 100 |
| up to 40 | 29 | 25 | 23 | 20 | 130 |
| up to 50 | 41 | 38 | 34 | 32 | 160 |
| Tensile strength (kg/cm$^2$) | 803 | 795 | 765 | 745 | 758 |
| Tensile modulus (ton/cm$^2$) | 33.5 | 32.5 | 32.0 | 31.0 | 31.2 |
| Flexural strength (kg/cm$^2$) | 1147 | 1100 | 1050 | 1039 | 1190 |
| Flexural modulus (ton/cm$^2$) | 30.5 | 29.0 | 28.0 | 27.8 | 28.6 |
| Izod ixpact strength (notched, kg-cm/cm) | 3.1 | 3.0 | 3.0 | 2.9 | 3.1 |
| Tensile impact strength (kg-cm/cm$^2$) | 106 | 107 | 103 | 105 | 82 |
| Molding shrinkage (%) | 1.17 | 1.19 | 1.21 | 1.22 | 1.20 |
| Water absorption (wt. %, 23° C./24 hr) | 0.19 | 0.20 | 0.21 | 0.22 | 0.21 |
| Coefficient of linear expansion (10$^{-5}$ cm/cm, °C.) | 7.0 | 7.3 | 7.8 | 8.2 | 7.0 |

EXAMPLES 10–12 AND COMPARATIVE EXAMPLE 4

In each run, the same polyamide MXD10 and polyamide 610 as used in Examples 4 to 6 were mixed and processed into strand cut pellets. The molded specimens were prepared by using an injection molding machine as in Example 1. The required cooling times and the properties of the molded specimens were measured.

The results are shown in Table 4. The results obtained in Comparative Example 3 (same as in Table 3) are slso given in Table 4 for easy reference.

In Examples 10 to 12 in which part of polyamide MXD10 was replaced with polyamide 612, the times required for cooling during injection molding were drastically shortened, and an improvement in various properties was noted.

TABLE 4

|  | Example | | | Comparative Example | |
|---|---|---|---|---|---|
| Run | 10 | 11 | 12 | 4 | 3 |
| Polyamide MXD10 (parts by weight) | 95 | 90 | 80 | 75 | 100 |
| Polyamide 612 (parts by weight) | 5 | 10 | 20 | 25 | 0 |
| TEST RESULTS | | | | | |
| Time required for cooling (seconds) | | | | | |
| D-type hardness | | | | | |
| up to 30 | 18 | 19 | 20 | 20 | 100 |
| up to 40 | 27 | 27 | 26 | 25 | 130 |
| up to 50 | 40 | 39 | 38 | 37 | 160 |
| Tensile strength (kg/cm$^2$) | 810 | 800 | 780 | 751 | 758 |
| Tensile modulus (ton/cm$^2$) | 33.5 | 32.0 | 31.6 | 31.0 | 31.2 |
| Flexural strength (kg/cm$^2$) | 1156 | 1105 | 1098 | 1058 | 1190 |
| Flexural modulus (ton/cm$^2$) | 32.0 | 30.5 | 29.3 | 28.1 | 28.6 |
| Izod impact strength (notched, kg-cm/cm) | 3.20 | 3.15 | 3.05 | 3.10 | 3.1 |
| Tensile impact strength (kg-cm/cm$^2$) | 106 | 128 | 137 | 158 | 82 |
| Molding shrinkage (%) | 1.25 | 1.30 | 1.40 | 1.50 | 1.20 |
| Water absorption (wt. %, 23° C./24 hr) | 0.20 | 0.20 | 0.21 | 0.22 | 0.21 |
| Coefficient of linear expansion (10$^{-5}$ cm/cm, °C.) | 7.0 | 7.1 | 7.7 | 8.0 | 7.0 |

EXAMPLES 13–14

In each run, 90 parts by weight of the same polyamide MXD10 as used in Examples 1 to 3 was mixed with 10 parts by weight of polyamide 610 (relative viscosity: 2.59) or polyamide 612 (relative viscosity: 2.15), and the mixture was processed and molded in the same way as in Examples 7 to 9. The resistance to calcium chloride stress cracking of the molded specimens was measured, and the results are shown in Table 5.

TABLE 5

| Example | 13 | 14 |
|---|---|---|
| Proportions of the components (parts by weight) | | |
| Polyamide MXD10 | 90 | 90 |
| Polyamide 610 | 10 | — |
| Polyamide 612 | — | 10 |
| Number of cycles performed until cracking first occurred | more than 10 | more than 10 |
| Percent retention (%) of tensile strength after 10 cycles | 97 | 98 |

The results given in Table 5 demonstrate that even after 10 cycles of the calcium chloride stress treatment, cracking did not occur on the surfaces of the molded specimens from the polyamide resin compositions of the invention, and a reduction in strength was very little, and that therefore, the polyamide resin compositions of the invention have excellent resistance to calcium chloride stress cracking.

EXAMPLES 15–17 AND COMPARATIVE EXAMPLE 5

In each run, the same polyamide MXD10 as used in Examples 1 to 3 was mixed with polyamide 612 (relative viscosity: 2.15) in the proportions indicated in Table 6. One hundred parts by weight of the resulting mixture was mixed with 43 parts by weight of chopped glass strands having a length of 3 mm by a V-type blender. The mixture was then extruded into a string form by a screw melt-extruder. The strand was passed through a water bath to cool it, cut into pellets by a rotary cutter, and dried to obtain strand cut pellets.

The molded specimens were injection-molded as in Examples 1 to 3, and the required cooling times were evaluated. The results are shown in Table 6.

In Comparative Example 5, polyamide MXD10 alone was used. The results are also shown in Table 6.

It is seen from Table 6 that by adding a small amount of polyamide 612 to polyamide MXD10, the required cooling times during injection time can be drastically shortened.

When the D-type hardness was less than 30, the material flowing into the mold did not sufficiently solidify but was soft. Hence, the sprue was difficult to pull up, or the sprue or runner portion broke at the time of mold opening.

TABLE 6

|  |  | Example | | | Comparative Example |
|---|---|---|---|---|---|
| Run |  | 15 | 16 | 17 | 5 |
| Proportions (parts by weight) | | | | | |
| Polyamide MXD10 | | 97 | 95 | 85 | 100 |
| Polyamide 612 | | 3 | 5 | 15 | 0 |
| Glass fibers | | 43 | 43 | 43 | 43 |
| D-TYPE HARDNESS | | | | | |
| Mold temperature (°C.) | Required cooling time (sec.) | | | | |
| 70 | 15 | 9 | 20 | 30 | 3 |
|  | 20 | 12 | 35 | 38 | 5 |
|  | 25 | 25 | 45 | 46 | 10 |
|  | 30 | 35 | 50 | 52 | 15 |
| 100 | 15 | 20 | 30 | 35 | 10 |
|  | 20 | 28 | 45 | 47 | 13 |
|  | 25 | 37 | 55 | 55 | 17 |
|  | 30 | 46 | 60 | 62 | 20 |
| 130 | 10 | 17 | 23 | 32 | 10 |
|  | 15 | 24 | 33 | 41 | 15 |
|  | 20 | 43 | 48 | 50 | 20 |
|  | 25 | 52 | 58 | 60 | 25 |

TABLE 6-continued

| Run | Example | | | Comparative Example |
|---|---|---|---|---|
| | 15 | 16 | 17 | 5 |
| | 30 | 60 | 66 | 67 | 30 |

EXAMPLES 18-20

In each run, the same polyamide MXD10 as used in Examples 1 to 3 was mixed with polyamide 610 (relative viscosity: 2.59) in the proportions indicated in Table 7. The mixture was mixed with glass fibers (the same as used in Examples 15 to 17), and the mixture was extruded to form strand cut pellets.

The molded specimens were prepared by using an injection molding machine, and the D-type hardness of the molded specimens were measured as in Examples 15 to 17.

The results are shown in Table 7. The results of Comparative Example 5 in which only polyamide MXD10 was used as the polyamide resin, and which are shown in Table 6 are also given in Table 7 for easy reference.

TABLE 7

| Run | Example | | | Comparative Example |
|---|---|---|---|---|
| | 18 | 19 | 20 | 5 |
| Proportions (parts by weight) | | | | |
| Polyamide MXD10 | 97 | 95 | 85 | 100 |
| Polyamide 610 | 3 | 5 | 15 | 0 |
| Glass fibers | 43 | 43 | 43 | 43 |
| D-TYPE HARDNESS | | | | |
| Mold temperature (°C.) / Required cooling time (sec.) | | | | |
| 100 / 15 | 21 | 31 | 38 | 10 |
| 20 | 30 | 46 | 50 | 13 |
| 25 | 39 | 55 | 57 | 17 |
| 30 | 44 | 65 | 65 | 20 |

EXAMPLES 21-23 AND COMPARATIVE EXAMPLES 6-7

In each run, the same polyamide MXD10 and polyamide 612 as used in Examples 1 to 3 were mixed in the proportions indicated in Table 8. One hundred parts by weight of the polyamide resin mixture was mixed with 43 parts by weight of chopped strand glass, and was processed in the same way as in Examples 1 to 3 to form as pellets.

The pellets were injection-molded and the required cooling time (D-type hardness, up to 30, 40 and 50) and the properties of the molded specimens were measured, and the results are shown in Table 8.

In Comparative Example 6, the mixture with 75 parts by weight of polyamide MXD10 and 25 parts by weight of polyamide 612 were outside the scope of the invention. In Comparative Example 7, only the polyamide MXD10 was used as the polyamide resin. The results are also shown in Table 8.

It is seen from Table 8 that in Examples 21 to 23 in which parts of polyamide MXD10 was replaced by polyamide 612, the required cooling times in injection molding were drastically shortened, and an improvement in various properties was noted.

TABLE 8

| Run | Example | | | Comparative Example | |
|---|---|---|---|---|---|
| | 21 | 22 | 23 | 6 | 7 |
| Polyamide MXD10 (parts by weight) | 97 | 95 | 85 | 75 | 100 |
| Polyamide 612 (parts by weight) | 3 | 5 | 15 | 25 | 0 |
| Glass fibers (parts by weight) | 43 | 43 | 43 | 43 | 43 |
| TEST RESULTS | | | | | |
| Time required for cooling (seconds) D-type hardness | | | | | |
| up to 30 | 21 | 14 | 11 | 9 | 55 |
| up to 40 | 28 | 18 | 15 | 14 | 80 |
| up to 50 | 48 | 23 | 21 | 19 | 110 |
| Tensile strength (kg/cm$^2$) | 1700 | 1634 | 1648 | 1649 | 1750 |
| Tensile modulus (ton/cm$^2$) | 110 | 107 | 104 | 102 | 118 |
| Flexural strength (kg/cm$^2$) | 2280 | 2278 | 2270 | 2259 | 2250 |
| Flexural modulus (ton/cm$^2$) | 108 | 91 | 89 | 87 | 113 |
| Izod impact strength (notched, kg-cm/cm) | 7.7 | 7.7 | 8.2 | 9.0 | 7.5 |
| Tensile impact strength (kg-cm/cm$^2$) | 200 | 194 | 195 | 196 | 105 |
| Molding shrinkage (%) | 0.40 | 0.39 | 0.43 | 0.49 | 0.56 |
| Water absorption (wt. %, 23° C./24 hr) | 0.14 | 0.14 | 0.16 | 0.17 | 0.20 |

EXAMPLES 24-25

In each run, 90 parts by weight of the same polyamide MXD10 as used in Examples 1 to 3 was mixed with 10 parts by weight of polyamide 610 (relative viscosity: 2.59) or polyamide 612 (relative viscosity: 2.15). One hundred parts by weight of the mixture was mixed with 43 parts by weight of chopped strand glass having a length of 3 mm, and the mixture was processed and molded in the same way as in Examples 21 to 23. The resistance to calcium chloride stress cracking of the molded specimens was measured, and the results are shown in Table 9.

TABLE 9

| Example | 24 | 25 |
|---|---|---|
| Proportions of the components (parts by weight) | | |
| Polyamide MXD10 | 90 | 90 |
| Polyamide 610 | 10 | — |
| Polyamide 612 | — | 10 |
| Glass fibers | 43 | 43 |
| Number of cycles performed until cracking first occurred | more than 10 | more than 10 |
| Percent retention (%) of tensile strength after 10 cycles | 100 | 100 |

The results given in Table 9 demonstrate that even after 10 cycles of the calcium chloride stress treatment, cracking did not occur on the surfaces of the molded specimens from the polyamide resin compositions of the invention, and a reduction in strength was very little, and that therefore, the polyamide resin composition of this invention has excellent resistance to calcium chloride stress cracking.

As specifically illustrated by the foregoing examples, the polyamide resin composition of this invention has excellent mechanical properties such as tensile strength, tensile modulus and flexural modulus, water resistance, and chemical properties such as resistance to calcium chloride stress cracking, as well as excellent moldability with a shortened molding cycle time. It is a very useful molding material.

What is claimed is:

1. A molding polyamide resin compostion comprising 100 parts by weight of (A) a poly(m-xylylenesebacamide) resin, and 1 to 20 parts by weight of (B) a crystalline polyamide selected from the group consisting of polyamide 610 and polyamide 612.

2. A molding polyamide resin composition comprising 100 parts by weight of (A) a poly(m-xylylenesebacamide) resin, 1 to 20 parts by weight of (B) a crystalline polyamide selected from the group consisting of polyamide 610 and polyamide 612, and (C) glass fibers.

3. The composition of claim 2 wherein the proportion of the glass fibers is 10 to 150 parts by weight per 100 parts by weight of the poly(m-xylylenesebacamide) resin (A).

* * * * *